United States Patent
Prasad et al.

(10) Patent No.: US 10,671,301 B2
(45) Date of Patent: Jun. 2, 2020

(54) SYSTEM AND METHOD OF CONFIGURING ONE OR MORE MEMORY MEDIA

(71) Applicant: Dell Products L.P., Round Rock, TX (US)

(72) Inventors: Parmeshwr Prasad, Bangalore (IN); Binoy Samuel Thomas, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 16/008,506

(22) Filed: Jul. 20, 2018

(65) Prior Publication Data
US 2020/0026443 A1    Jan. 23, 2020

(51) Int. Cl.
*G06F 12/00*    (2006.01)
*G06F 3/06*    (2006.01)
*G06F 12/1009*    (2016.01)
*G06F 9/455*    (2018.01)

(52) U.S. Cl.
CPC .......... *G06F 3/0631* (2013.01); *G06F 3/0607* (2013.01); *G06F 3/0685* (2013.01); *G06F 9/45558* (2013.01); *G06F 12/1009* (2013.01); *G06F 2009/45579* (2013.01)

(58) Field of Classification Search
CPC .... G06F 3/0631; G06F 3/0607; G06F 3/0685; G06F 9/45558; G06F 12/1009; G06F 2009/45579
See application file for complete search history.

(56) References Cited

U.S. PATENT DOCUMENTS

| | | | |
|---|---|---|---|
| 6,990,576 B2 | 1/2006 | Qureshi et al. | |
| 2012/0174097 A1* | 7/2012 | Levin | G06F 9/5077 718/1 |
| 2013/0117494 A1* | 5/2013 | Hughes | G06F 9/5077 711/6 |
| 2015/0293841 A1* | 10/2015 | Akirav | G06F 3/0683 711/104 |
| 2016/0212064 A1* | 7/2016 | Biswas | H04L 47/781 |
| 2016/0239396 A1* | 8/2016 | Deng | G06F 11/00 |
| 2019/0042414 A1* | 2/2019 | Juenemann | G06F 3/0656 |

(Continued)

OTHER PUBLICATIONS

Intel Corporation, "Intel Itanium Processor Family System Abstraction Layer Specification." Revision 3.4, Intel, 2002; 146 pages, 2002.

(Continued)

*Primary Examiner* — Prasith Thammavong
(74) *Attorney, Agent, or Firm* — Baker Botts L.L.P.

(57) ABSTRACT

In one or more embodiments, one or more systems, method, and/or processes may store first data associated with a virtual non-volatile dual in-line memory module (vNVDIMM) of a virtual machine (VM) via a portion of storage of a first physical memory medium of a physical information handling system (IHS); may receive a request for a size increase of the vNVDIMM; may allocate, based at least on the size increase, another portion of storage from the first physical memory medium or from a second physical memory medium of the physical IHS; may create another vNVDIMM configured to accommodate the size increase and configured to store data via the portion of storage and the other portion of storage; and may provide information associated with the other vNVDIMM to the VM.

20 Claims, 9 Drawing Sheets

(56) References Cited

U.S. PATENT DOCUMENTS

| | | | |
|---|---|---|---|
| 2019/0114192 A1* | 4/2019 | Rao | G06F 21/6218 |
| 2019/0171580 A1* | 6/2019 | Suryanarayana ... | G06F 12/1009 |
| 2019/0258502 A1* | 8/2019 | Sanjeepan | G06F 3/061 |
| 2019/0332411 A1* | 10/2019 | Leitao | G06F 9/45558 |
| 2019/0340133 A1* | 11/2019 | Covelli | G06F 12/0804 |

OTHER PUBLICATIONS

Intel Corporation, "NVDIMM Block Window Driver Writer's Guide." Example NFIT-Based NVDIMM Block Window and Persistent Memory Interface Guide, Jul. 2016; 38 pages, Jul. 2016.

Intel Corporation, "ACPI based HotPlug Driver that Supports Memory HotPlug." 2004 Intel Corporation <Naveen.b.s@intel.com.; 9 pages, 2004.

Brown, Len et al. "ACPI in Linux." Architecture, Advances, and Challenges, Intel Open Source Technology Center, 2005; 20 pages, 2005.

* cited by examiner

SYSTEM AND METHOD OF CONFIGURING ONE OR MORE MEMORY MEDIA

BACKGROUND

Field of the Disclosure

This disclosure relates generally to information handling systems and more particularly to memory medium configurations.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, method, and/or processes may store first data associated with a virtual non-volatile dual in-line memory module (vNVDIMM) of a virtual machine via a portion of storage of a first physical memory medium of a physical information handling system; may receive, from the virtual machine, a request for a size increase of the vNVDIMM; may allocate, based at least on the size increase, another portion of storage from the first physical memory medium or from a second physical memory medium of the physical information handling system; may create another vNVDIMM configured to accommodate the size increase and configured to store data via the portion of storage and the other portion of storage; may provide information associated with the other vNVDIMM to the virtual machine; may receive, from the virtual machine, second data associated with the other vNVDIMM; and may store at least a portion of the second data associated with the other vNVDIMM via the other portion of storage.

In one or more embodiments, providing the information associated with the other vNVDIMM to the virtual machine may include providing the information associated with the other vNVDIMM to the virtual machine via general purpose input/output (GPIO) of the virtual machine. In one or more embodiments, one or more systems, method, and/or processes may further receive, from the virtual machine, a request for data associated with the other vNVDIMM; may further provide, to the virtual machine, at least a portion of data from the portion of storage; and may further provide, to the virtual machine, at least a portion of data from the other portion of storage. In one or more embodiments, allocating the other portion of storage from the first physical memory medium or from the second physical memory medium of the physical information handling system may include allocating the other portion of storage from the second physical memory medium. In one example, the first physical memory medium includes a physical non-volatile dual in-line memory module (NVDIMM) and the second physical memory medium includes a second NVDIMM, different from the first NVDIMM. In another example, the first physical memory medium includes a physical NVDIMM and the second physical memory medium includes a dual in-line memory module (DIMM) backed by a non-volatile memory medium. For instance, the non-volatile memory medium may include at least one of a hard disk drive and a solid state drive, among others. In one or more embodiments, allocating the other portion of storage from the first physical memory medium or from the second physical memory medium of the physical information handling system may include allocating the other portion of storage from the first physical memory medium. For example, the first physical memory medium may include a physical NVDIMM.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a virtual machine (VM) may include a virtual non-volatile dual in-line memory module (vNVDIMM). In one example, a vNVDIMM may be associated with a physical dual in-line memory module (NVDIMM). For instance, the physical NVDIMM may include volatile memory and non-volatile memory, which the non-volatile memory may store data of the volatile memory. In another example, a vNVDIMM may be associated with a memory backed file. For instance, the memory backed file may store data of a volatile memory medium.

In one or more embodiments, an interface to a vNVDIMM may be provided to a VM. In one or more embodiments, an interface provided to a VM may include multiple portions of a memory medium. In one example, the interface provided to the VM may include multiple portions of a physical NVDIMM. In another example, the interface provided to the VM may include multiple portions of a memory backed file. In one or more embodiments, an interface provided to a VM may include multiple memory media. In one example, the interface provided to the VM may include multiple physical dual in-line memory modules (NVDIMMs). In another example, the interface provided to the VM may include multiple memory backed files. In one or more embodiments, an interface provided to a VM may include multiple different memory media. In one example, the interface provided to the VM may include a physical NVDIMM and a memory backed file.

In one or more embodiments, an interface provided to a VM may include a continuous address space. In one example, the interface provided to the VM may include a continuous address space that is associated with multiple address spaces that may not be continuous. In another example, the interface provided to the VM may include a continuous address space that is associated with different memory media that are associated with different address spaces that may not be continuous.

In one or more embodiments, a VM may include a seamless storage requirement. For example, the seamless storage requirement of the VM may include a requirement for continuous addresses of a memory medium provided to the VM. For instance, the memory medium provided to the VM may be or include a vNVDIMM. In one or more embodiments, the VM may establish a file system on the vNVDIMM. For example, after the VM establishes the file system on the vNVDIMM, the VM may utilize the vNVDIMM as a NVDIMM. In one instance, an operating system executing on the VM and/or an application executing on the VM may utilize the vNVDIMM as a physical NVDIMM. In another instance, a memory management unit (MMU) and/or an input/output MMU (IOMMU) of the VM may utilize the vNVDIMM as a physical NVDIMM.

In one or more embodiments, the vNVDIMM may be expanded. For example, expanding the vNVDIMM may include increasing a storage size of the vNVDIMM. For instance, the storage size of the vNVDIMM may be one gigabyte (GB), and the storage size of the vNVDIMM may be increased to two GB. In one or more embodiments, if two GB of a physical NVDIMM is available, the vNVDIMM may be deleted and/or eliminated, and two GB of the physical NVDIMM may be utilized for the vNVDIMM. In one or more embodiments, the data of the one GB vNVDIMM may be lost. In one or more embodiments, the data of the one GB vNVDIMM may be copied and/or replicated to the two GB of the physical NVDIMM. For example, the data of the one GB vNVDIMM may be copied and/or replicated to a non-volatile memory medium. For instance, the data of the one GB vNVDIMM may be copied and/or replicated to a hard drive and/or a solid state drive, among others. In one or more embodiments, the copied and/or replicated data of the one GB vNVDIMM may be copied and/or replicated to the two GB vNVDIMM. For example, the copied and/or replicated data of the one GB vNVDIMM may be copied and/or replicated from the non-volatile memory medium to the two GB vNVDIMM. For instance, the copied and/or replicated data of the one GB vNVDIMM may be copied and/or replicated from the hard drive and/or the solid state drive, among others, to the two GB vNVDIMM.

In one or more embodiments, increasing storage space of the VM may include a hot add of a vNVDIMM. For example, an additional vNVDIMM may be added to the VM after the VM is booted and executing an operating system and/or executing one or more applications. In one or more embodiments, the additional vNVDIMM may be associated with an additional and/or different address space. For example, addressing the vNVDIMM, with which the VM booted, may be different from addressing the addition vNVDIMM. For instance, the vNVDIMM, with which the VM booted, may be associated with a first address space, and the additional vNVDIMM may be associated with a second address space, different from the first address space and/or non-continuous with the first address space. In one or more embodiments, a firmware interface table (FIT) of the VM may prevent and/or preclude increasing a size of an existing vNVDIMM via a hot add method and/or process. For example, the FIT may reside in a read-only memory. In one instance, the FIT may describe a layout of the read-only memory. In another instance, the FIT may describe where each type of VM firmware component is located.

In one or more embodiments, a host aware conjoined vNVDIMM layout at a host level may be utilized. For example, the host aware conjoined vNVDIMM layout at the host level may dynamically provide a unified vNVDIMM to a VM. For instance, any portion of dual in-line memory module (DIMM) physical address may become included in a guest physical address (GPA) of a VM. In one or more embodiments, a DIMM physical address (DPA) may be translated to a GPA.

Figure 1:
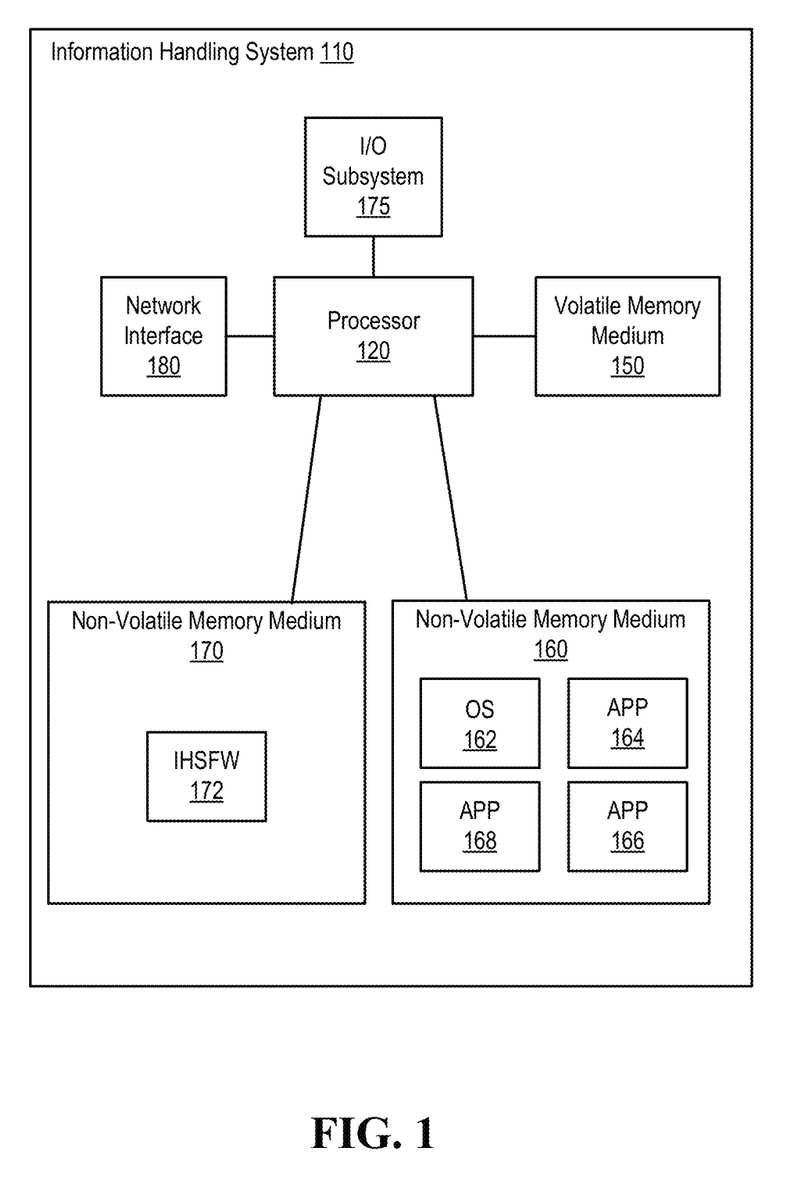
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. In one or more embodiments, IHS 110 may be a physical information handling system. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, Hyper-Transport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
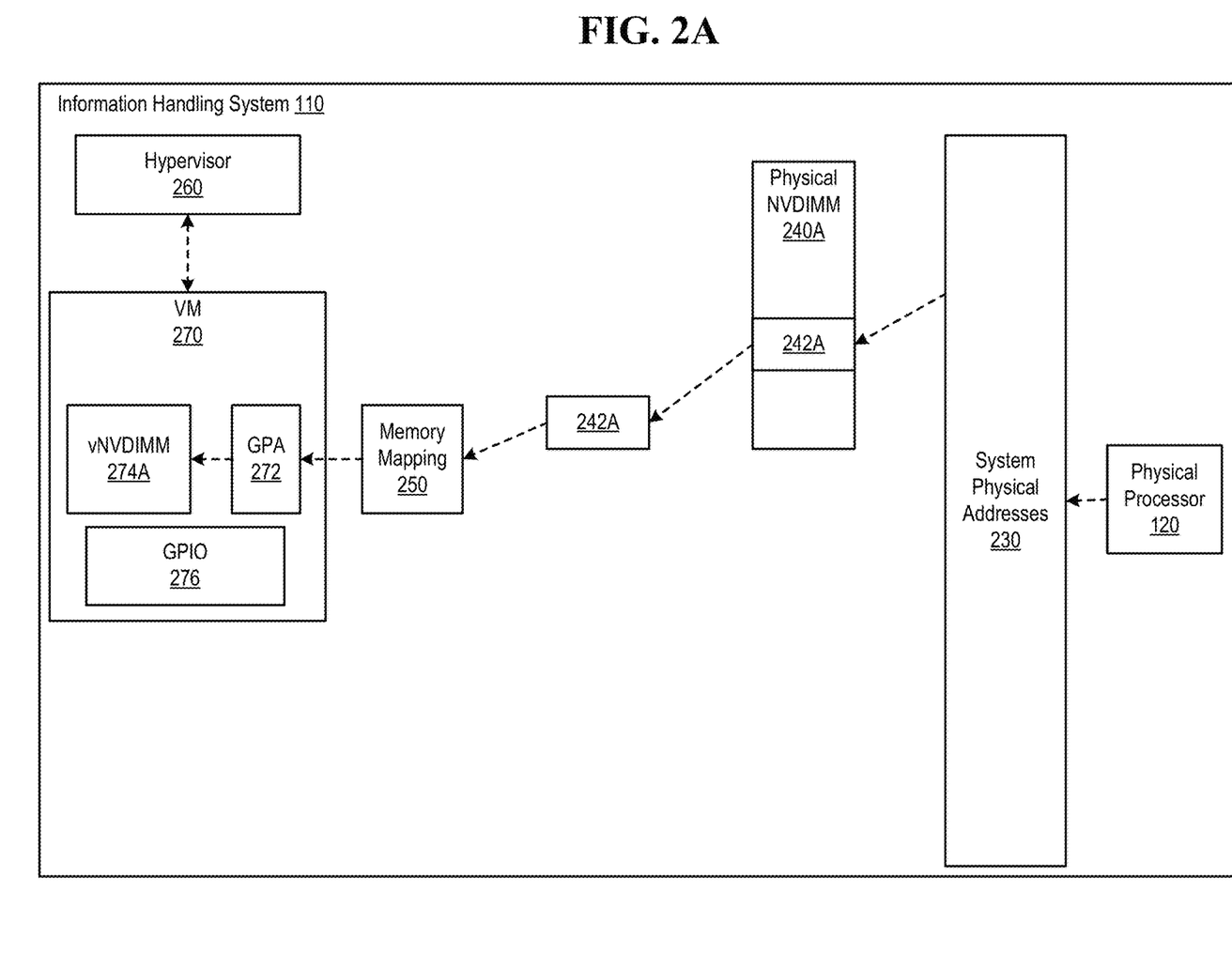
FIG. 2A illustrates an example of a memory medium configuration, according to one or more embodiments.

Turning now to FIG. 2A, an example of a memory medium configuration is illustrated, according to one or more embodiments. In one or more embodiments, IHS 110 may include and/or execute a hypervisor 260. For example, hypervisor 260 may be or include a virtual machine monitor (VMM). For instance, hypervisor 260 may be utilized in running one or more virtual machines via IHS 110. In one or more embodiments, hypervisor 260 may enable execution of one or more virtual machines (VMs) 270. For example, a VM may provide functionality of a physical computer (e.g., IHS 110). In one instance, a VM may be or include a system VM (e.g., a fully virtualized VM) that may provide a suitable substituted for a physical IHS, as the system VM may provide one or more functionalities utilized in executing an entire OS. In another instance, a hypervisor may utilize native execution in sharing and managing one or more hardware resources, which may permit multiple computing environments to be isolated from one another and exist via a single IHS.

As shown, physical processor 120 may be associated with system physical addresses 230. As illustrated, system physical addresses 230 may be associated with a physical NVDIMM 240A. In one or more embodiments, system physical addresses 230 may be associated with a memory medium portion 242A of NVDIMM 240A. In one or more embodiments, memory medium portion 242A may be mapped via memory mapping 250. For example, memory mapping 250 may be provided to a GPA 272 of VM 270. For instance, memory mapping 250 may be a continuous address space that is associated with memory medium portion 242A. In one or more embodiments, a vNVDIMM 274A may be configured and/or implemented via GPA 272.

Figure 2B:
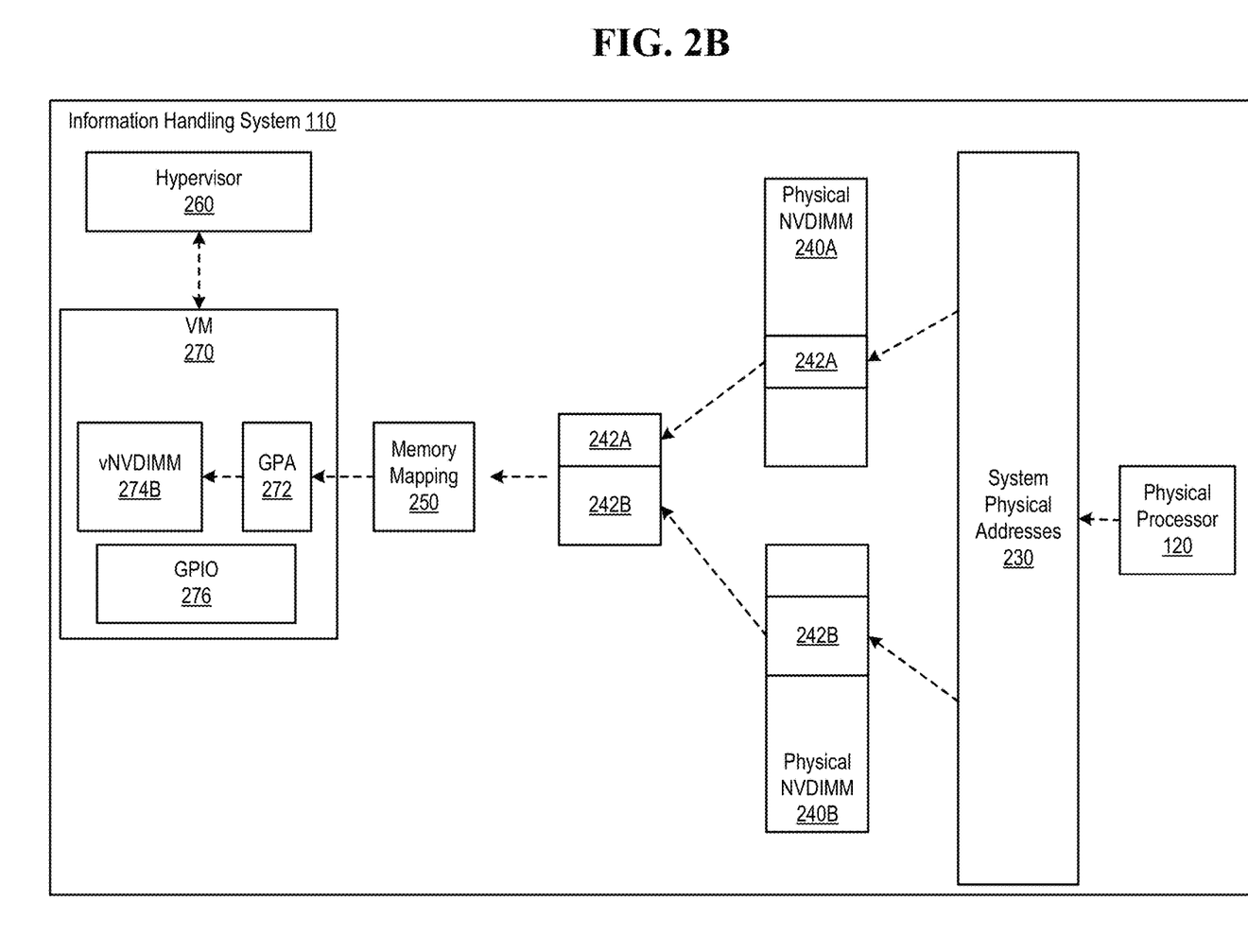
FIG. 2B illustrates a second example of a memory medium configuration, according to one or more embodiments.

Turning now to FIG. 2B, a second example of a memory medium configuration is illustrated, according to one or more embodiments. In one or more embodiments, additional storage may be requested. For example, VM 270 may request additional storage. For instance, an increase in a size of vNVDIMM 274 may be requested. As illustrated, system physical addresses 230 may be associated with physical NVDIMMs 240A and 240B. In one or more embodiments, system physical addresses 230 may be associated with memory medium portion 242A of NVDIMM 240A and a memory medium portion 242B of NVDIMM 240B. In one or more embodiments, a memory medium portion 242B may provide the additional storage. In one or more embodiments, memory medium portions 242A and 242B may be mapped via a memory mapping 250. For example, memory mapping 250 may be provided to a GPA 272 of VM 270. For instance, memory mapping 250 may be a continuous address space that is associated with memory medium portions 242A and 242B. In one or more embodiments, a vNVDIMM 274B may be configured and/or implemented via GPA 272. For example, vNVDIMM 274B may be configured and/or implemented via memory medium portions 242A and 242B. For instance, vNVDIMM 274B may be configured and/or implemented as a continuous address space via memory medium portions 242A and 242B.

Figure 2C:
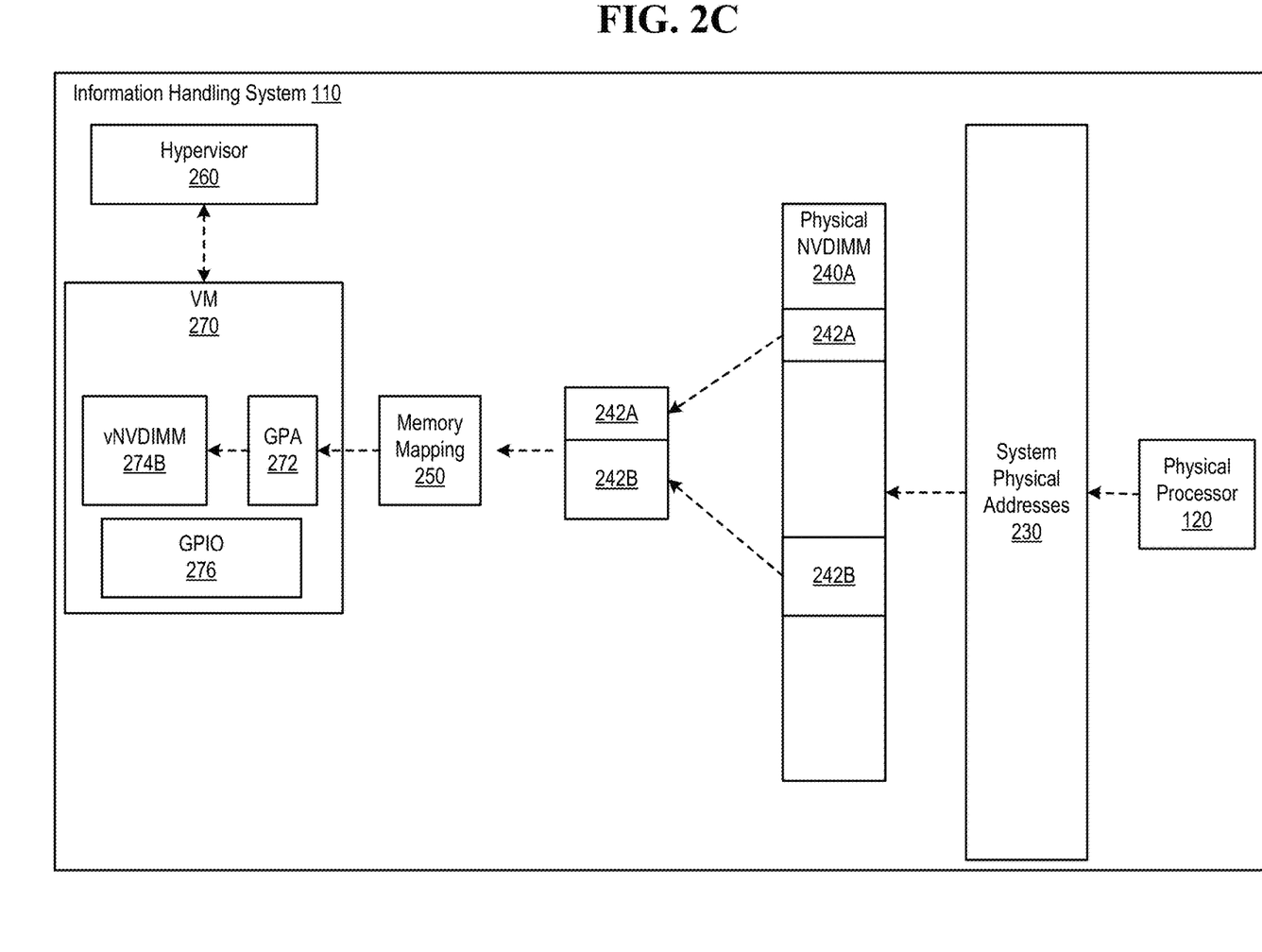
FIG. 2C illustrates a third example of a memory medium configuration, according to one or more embodiments.

Turning now to FIG. 2C, a third example of a memory medium configuration is illustrated, according to one or more embodiments. In one or more embodiments, additional storage may be requested. For example, VM 270 may request additional storage. For instance, an increase in a size of vNVDIMM 274 may be requested. As illustrated, system physical addresses 230 may be associated with physical NVDIMM 240A. In one or more embodiments, system physical addresses 230 may be associated with memory medium portions 242A and 242B of NVDIMM 240A. In one or more embodiments, memory medium portion 242B may provide the additional storage. In one or more embodiments, memory medium portions 242A and 242B may be mapped via memory mapping 250. For example, memory mapping 250 may be provided to a GPA 272 of VM 270. For instance, memory mapping 250 may be a continuous address space that is associated with memory medium portions 242A and 242B. In one or more embodiments, vNVDIMM 274B may be configured and/or implemented via GPA 272. For example, vNVDIMM 274B may be configured and/or implemented via memory medium portions 242A and 242B. For instance, vNVDIMM 274B may be configured and/or implemented as a continuous address space via memory medium portions 242A and 242B.

Figure 2D:
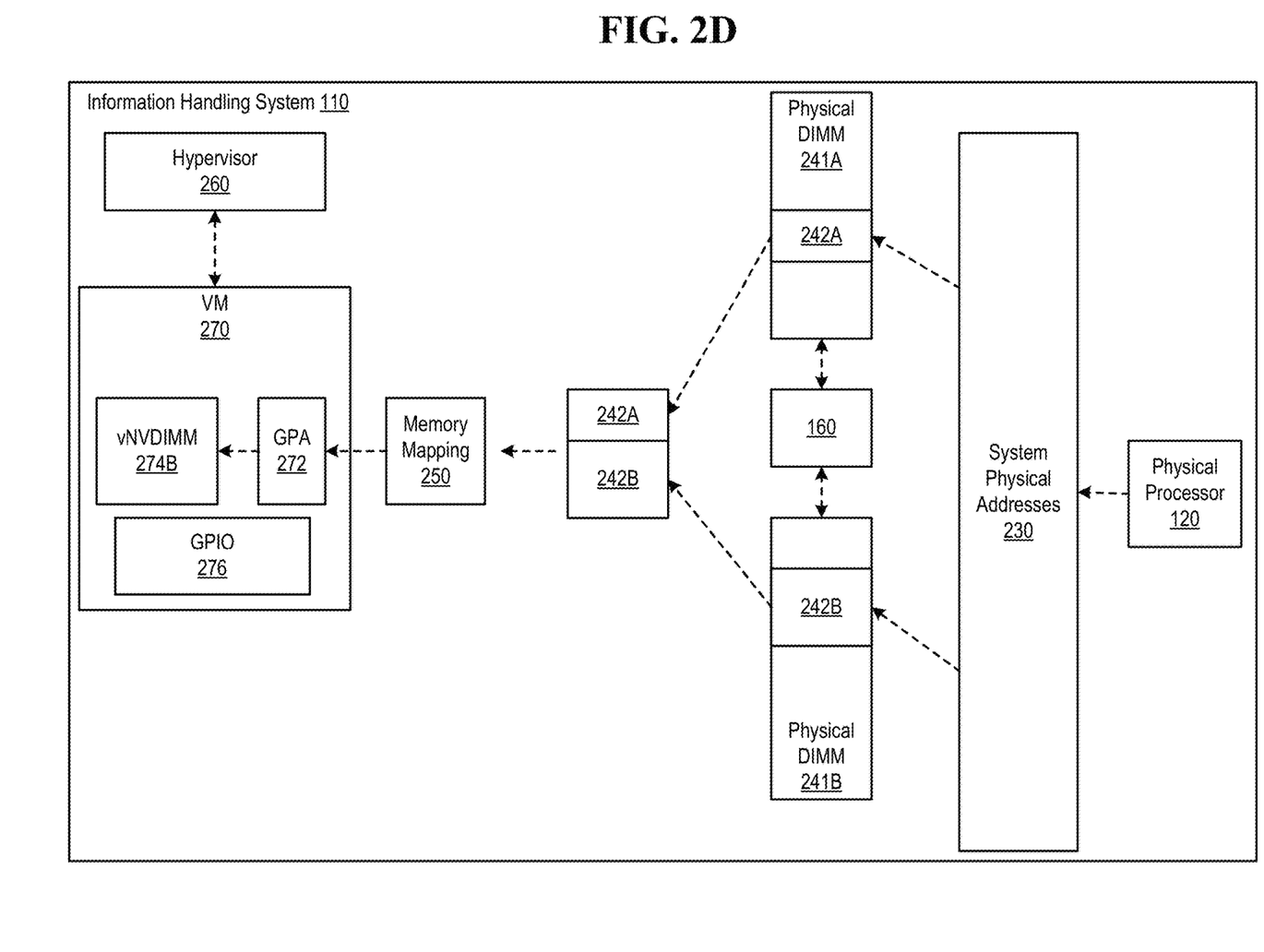
FIG. 2D illustrates a fourth example of a memory medium configuration, according to one or more embodiments.

Turning now to FIG. 2D, a fourth example of a memory medium configuration is illustrated, according to one or more embodiments. In one or more embodiments, additional storage may be requested. For example, VM 270 may request additional storage. For instance, an increase in a size of vNVDIMM 274 may be requested. As illustrated, system physical addresses 230 may be associated with physical DIMMs 241A and 241B. In one or more embodiments, system physical addresses 230 may be associated with a memory medium portion 242A of DIMM 241A and a memory medium portion 242B of DIMM 241B. In one or more embodiments, DIMMs 241A and 241B may be backed by non-volatile storage 160. For example, memory medium portions 242A and 242B may be backed by one or more files. In one instance, memory medium portions 242A and 242B may be backed by respective different files. In another example, memory medium portions 242A and 242B may be backed by a single file.

In one or more embodiments, vNVDIMM 274B may be implemented via one or more DIMMs 241 that may be backed by a non-volatile storage. For example, vNVDIMM 274B may be implemented via one or more DIMMs 241 that may be backed by a file system. In one or more embodiments, a memory medium portion 242B may provide the additional storage. In one or more embodiments, memory medium portions 242A and 242B may be mapped via memory mapping 250. For example, memory mapping 250 may be provided to GPA 272 of VM 270. For instance, memory mapping 250 may be a continuous address space that is associated with memory medium portions 242A and 242B. In one or more embodiments, vNVDIMM 274B may be configured and/or implemented via GPA 272. For example, vNVDIMM 274B may be configured and/or implemented via memory medium portions 242A and 242B. For instance, vNVDIMM 274B may be configured and/or implemented as a continuous address space via memory medium portions 242A and 242B.

Figure 2E:
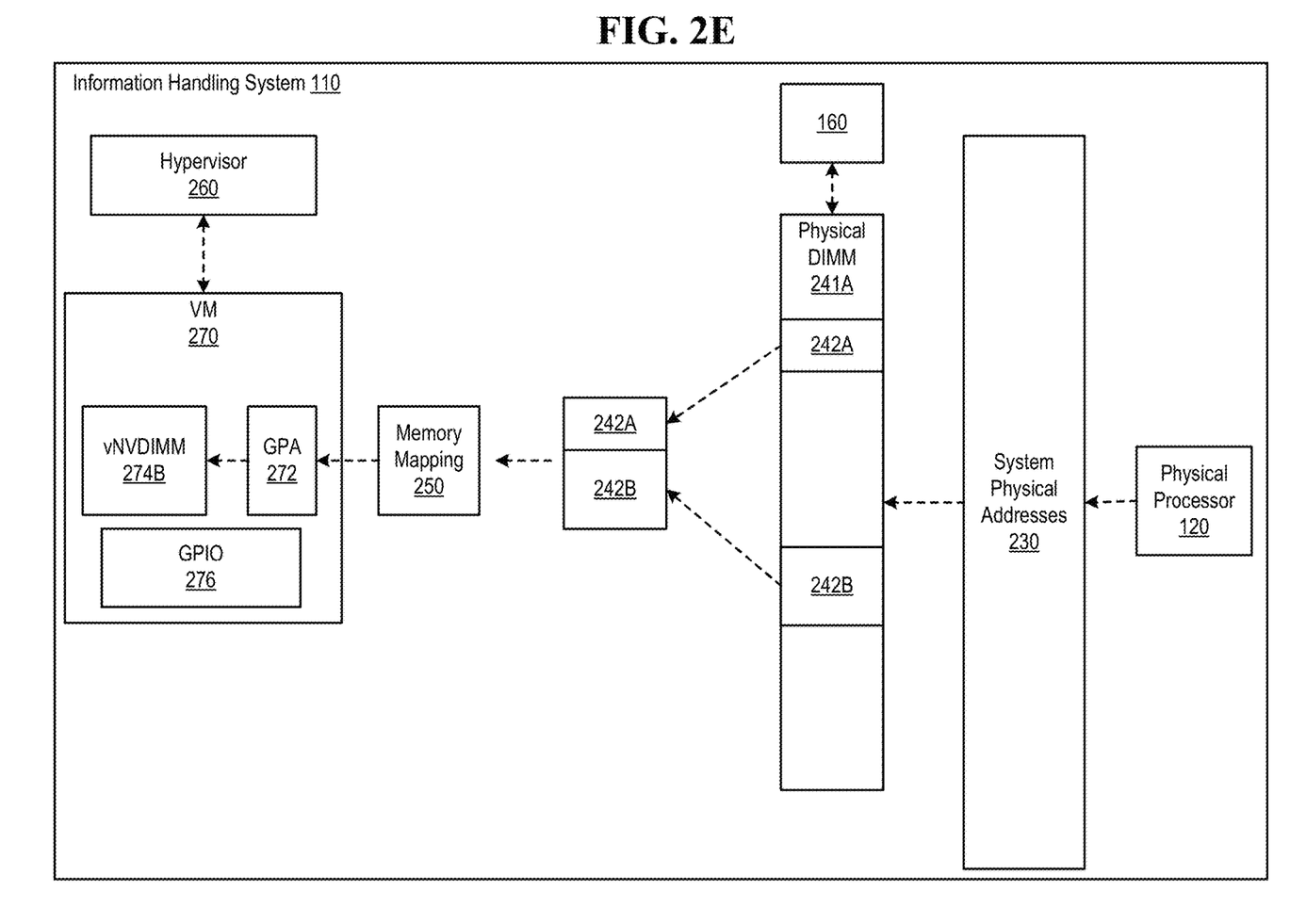
FIG. 2E illustrates a fifth example of a memory medium configuration, according to one or more embodiments.

Turning now to FIG. 2E, a fifth example of a memory medium configuration is illustrated, according to one or more embodiments. In one or more embodiments, additional storage may be requested. For example, VM 270 may request additional storage. For instance, an increase in a size of vNVDIMM 274 may be requested. As illustrated, system physical addresses 230 may be associated with physical DIMM 241A. In one or more embodiments, system physical addresses 230 may be associated with memory medium portions 242A and 242B of DIMM 241A. In one or more embodiments, DIMM 241A may be backed by non-volatile storage 160. For example, memory medium portions 242A and 242B may be backed by one or more files. In one instance, memory medium portions 242A and 242B may be backed by respective different files. In another example, memory medium portions 242A and 242B may be backed by a single file. In one or more embodiments, memory medium portion 242B may provide the additional storage. In one or more embodiments, memory medium portions 242A and 242B may be mapped via memory mapping 250. For example, memory mapping 250 may be provided to GPA 272 of VM 270. For instance, memory mapping 250 may be a continuous address space that is associated with memory medium portions 242A and 242B. In one or more embodiments, vNVDIMM 274B may be configured and/or implemented via GPA 272. For example, vNVDIMM 274B may be configured and/or implemented via memory medium portions 242A and 242B. For instance, vNVDIMM 274B may be configured and/or implemented as a continuous address space via memory medium portions 242A and 242B.

Figure 2F:
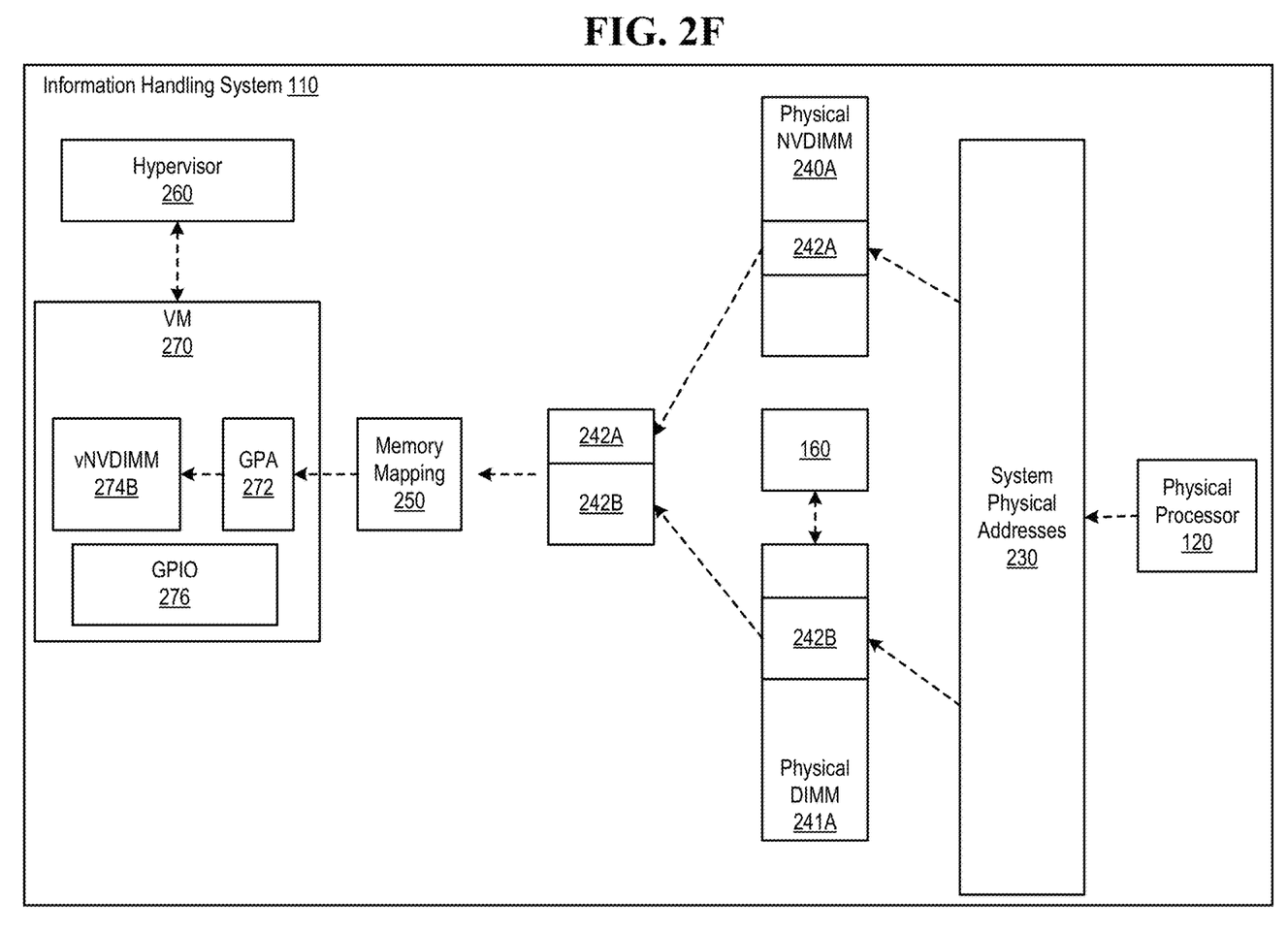
FIG. 2F illustrates another example of a memory medium configuration, according to one or more embodiments.

Turning now to FIG. 2F, another example of a memory medium configuration is illustrated, according to one or more embodiments. In one or more embodiments, additional storage may be requested. For example, VM 270 may request additional storage. For instance, an increase in a size of vNVDIMM 274 may be requested. As illustrated, system physical addresses 230 may be associated with physical NVDIMM 240A and physical DIMM 241A. In one or more embodiments, system physical addresses 230 may be associated with memory medium portion 242A of NVDIMM 240A and a memory medium portion 242B of DIMM 241A. In one or more embodiments, DIMM 241A may be backed by non-volatile storage 160. For example, memory medium portion 242B may be backed by one or more files. In one instance, memory medium portion 242B may be backed by different files. In another example, memory medium portion 242B may be backed by a single file. In one or more embodiments, a memory medium portion 242B may provide the additional storage. In one or more embodiments, memory medium portions 242A and 242B may be mapped via memory mapping 250. For example, memory mapping 250 may be provided to a GPA 272 of VM 270. For instance, memory mapping 250 may be a continuous address space that is associated with memory medium portions 242A and 242B. In one or more embodiments, vNVDIMM 274B may be configured and/or implemented via GPA 272. For example, vNVDIMM 274B may be configured and/or implemented via memory medium portions 242A and 242B. For instance, vNVDIMM 274B may be configured and/or implemented as a continuous address space via memory medium portions 242A and 242B.

Figure 3:
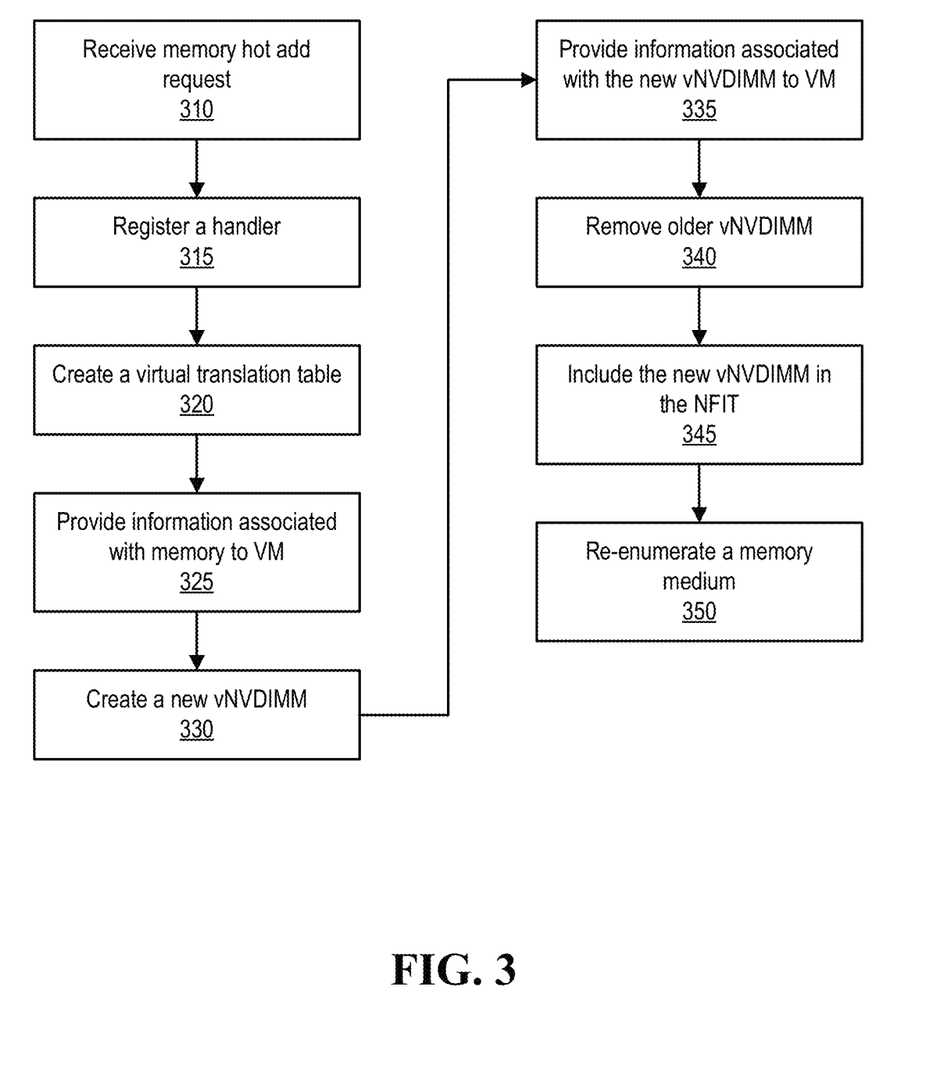
FIG. 3 illustrates an example of a method of utilizing storage with a virtual machine, according to one or more embodiments.

Turning now to FIG. 3, an example of a method of utilizing storage with a virtual machine is illustrated, according to one or more embodiments. At 310, a memory hot add request may be received. For instance, a hypervisor may receive a memory hot add from a virtual machine. For instance, hypervisor 260 may receive a memory hot add from VM 270. In one or more embodiments, the memory hot add request may be or include a memory hot add event. For example, the memory hot add event may be or include an ACPI general purpose event (GPE). At 315, a handler may be registered. For example, hypervisor 260 may register a handler. For instance, the handler may receive an address of memory to be added and a size of the memory to be added. In one or more embodiments, the memory to be added may be or include a vNVDIMM. In one or more embodiments, the handler may provide the address of the memory to be added and the size of the memory to be added to VM 270 via GPIO 276 of VM 270.

At 320, a virtual translation table may be created. For example, a virtualization linker and loader may create a virtual translation table. For instance, hypervisor 260 may include the virtualization linker and loader. In one or more embodiments, the virtual translation table may include multiple addresses of respective memory media. In one example, the virtual translation table may include multiple addresses of respective physical NVDIMMs 240A and 240B. For instance, the virtual translation table may include an address of memory portion 242A of physical NVDIMM 240A and an address of memory portion 242B of physical NVDIMM 240B. In a second example, the virtual translation table may include multiple addresses of physical NVDIMM 240A. For instance, the virtual translation table may include an address of memory portion 242A of physical NVDIMM 240A and an address of memory portion 242B of physical NVDIMM 240A. In a third example, the virtual translation table may include multiple addresses of respective physical DIMMs 241A and 241B. For instance, the virtual translation table may include an address of memory portion 242A of physical DIMM 241A and an address of memory portion 242B of physical DIMM 241B. In a fourth example, the virtual translation table may include multiple addresses of physical DIMM 241A. For instance, the virtual translation table may include an address of memory portion 242A of physical DIMM 241A and an address of memory portion 242B of physical DIMM 241A. In another example, the virtual translation table may include multiple addresses of respective physical NVDIMM 240A and physical DIMM 241A. For instance, the virtual translation table may include an address of memory portion 242A of physical NVDIMM 240A and an address of memory portion 242B of physical DIMM 241A.

In one or more embodiments, the virtual translation table may include multiple addresses of one or more memory media. For example, the multiple addresses of one or more physical memory media. For instance, the virtual translation table may include an address of memory portion 242A and include an address of memory portion 242B, among others. In one or more embodiments, the virtual translation table may be or include memory mapping 250.

At 325, information associated with memory may be provided to the virtual machine. For example, an address and a size associated with memory may be provided to the virtual machine. For instance, an address and a size associated with memory may be provided to the VM 270. In one or more embodiments, the address and the size associated with the memory may be provided to the VM 270 via GPIO 276 of VM 270. In one or more embodiments, the handler may receive information associated with memory. For example, the handler may provide the address and the size associated with the memory may be provided to the VM 270 via GPIO 276 of VM 270. In one or more embodiments, the handler may utilize an identifier with the address and the size associated with the memory.

In one or more embodiments, a method and/or a process that includes a low probability of generating collisions may be utilized in determining and/or creating the identifier. For example, utilizing the method and/or process that includes a low probability of generating collisions may be considered to produce "unique" output values, since it includes the low probability of generating collisions. For instance, the identifier may be or include output from the method and/or process that includes the low probability of generating collisions. In one or more embodiments, the identifier may be or include one or more of a globally unique identifier (GUID), an universally unique identifier (UUID), and a hash value, among others.

At 330, a new vNVDIMM may be created. For example, a new vNVDIMM may be created utilizing an asynchronous DRAM refresh (ADR) method. For instance, a NVDIMM FIT (NFIT) may include the ADR method. In one or more embodiments, hypervisor 260 may create the new vNVDIMM via the ADR method. In one or more embodiments, the new vNVDIMM may be or include vNVDIMM 274B. For example, vNVDIMM 274B may be created without replicating (e.g., copying) data of memory medium portion 242A. At 335, information associated with the new vNVDIMM may be provided to the virtual machine. For example, hypervisor 260 may provide information associated with the new vNVDIMM to VM 270. For instance, hypervisor 260 may provide information associated with new vNVDIMM 274B to VM 270 via GPIO 276. In one or more embodiments, the information associated with new vNVDIMM 274B may include an address (e.g., a starting address) and a size. For example, GPA 272 may store the address and the size. For instance, GPIO 274 may provide the address and the size to GPA 272.

At 340, the virtual machine may remove an older vNVDIMM. For example, VM 270 may remove vNVDIMM 274A. For instance, vNVDIMM 274A may be removed GPA 272. In one or more embodiments, removing the older vNVDIMM may include providing an identifier (e.g., a GUID, a UUID, a hash, etc.) to the virtualization linker and loader. For example, hypervisor 260 may remove an entry of a virtual translation table associated with the identification associated with the older vNVDIMM. For instance, hypervisor 260 may remove an entry of a virtual translation table associated with an identification associated with vNVDIMM 274A.

At 345, the new vNVDIMM may be included in the NFIT. For example, hypervisor 260 may include the new vNVDIMM may be included in the NFIT of VM 270. At 350, a memory medium may be re-enumerated. For example, the virtual machine may instantiate a device specific method (DSM) to re-enumerate vNVDIMM 274. For instance, the DSM may re-enumerate vNVDIMM 274A to vNVDIMM 274B. In one or more embodiments, the DSM may re-enumerate vNVDIMM 274 based at least on an identification associated with vNVDIMM 274A and/or based at least on an identification associated with vNVDIMM 274B. For example, the an identification associated with vNVDIMM 274A may be different from the identification associated with vNVDIMM 274B. For instance, the DSM may determine a change in an identification associated with vNVDIMM 274 and may re-enumerate vNVDIMM 274 based at least on the change in the identification associated with vNVDIMM 274. In one or more embodiments, vNVDIMM 274B may include more storage than vNVDIMM 274A. For example, vNVDIMM 274B may include additional storage. For instance, vNVDIMM 274B may include storage of vNVDIMM 274A and additional storage.

Figure 4:
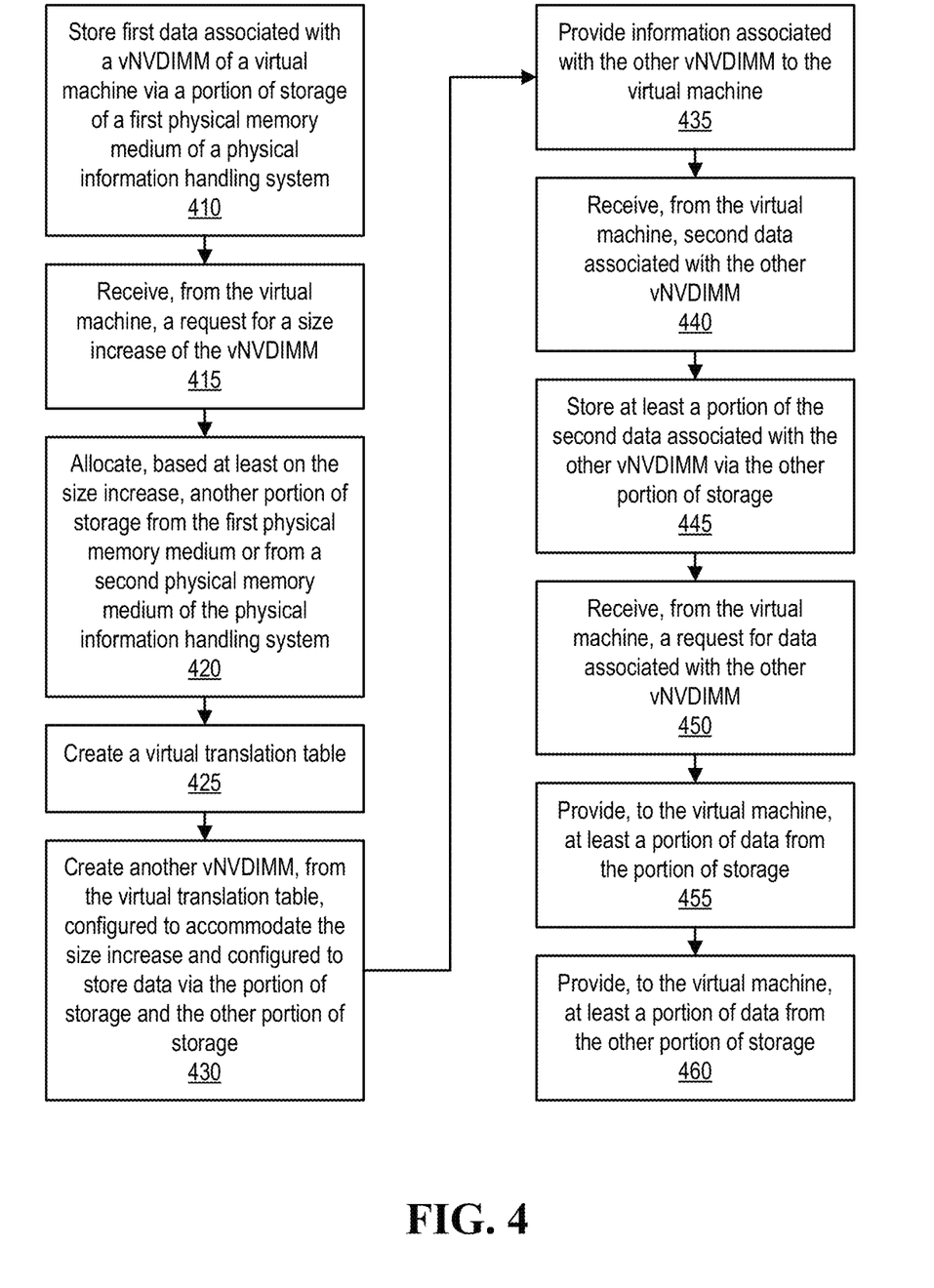
FIG. 4 illustrates another example of a method of utilizing storage with a virtual machine, according to one or more embodiments.

Turning now to FIG. 4, another example of a method of utilizing storage with a virtual machine is illustrated, according to one or more embodiments. At 410, first data associated with a vNVDIMM of a virtual machine may be stored via a portion of storage of a first physical memory medium of a physical information handling system. For example, first data associated with vNVDIMM 274A may be stored via memory medium portion 242A of physical NVDIMM 240A of IHS 110. At 415, a request for a size increase of the vNVDIMM of the virtual machine that is associated with a portion of storage from a first physical memory medium of a physical information handling system may be received from the virtual machine. For example, hypervisor 260 may receive the request for the size increase of the vNVDIMM of the virtual machine.

At 420, another portion of storage from the first physical memory medium or from a second physical memory medium of the physical information handling system may be allocated based at least on the size increase. For example, hypervisor 260 may allocate another portion of storage from the first physical memory medium or from a second physical memory medium of IHS 110. For instance, memory medium portion 242B may be allocated. At 425, a virtual translation table may be created. For example, hypervisor 260 may create a virtual translation table. In one or more embodiments, the virtual translation table may be or include mapping 250. At 430, another vNVDIMM, from the virtual translation table, configured to accommodate the size increase and configured to store data via the portion of storage and the other portion of storage may be created. For example, hypervisor 260 may create another vNVDIMM, from the virtual translation table, configured to accommodate the size increase and configured to store data via the portion of storage and the other portion of storage. For instance, hypervisor 260 may create vNVDIMM 274B, from the virtual translation table, configured to accommodate the size increase and configured to store data via memory medium portion 242A and memory medium portion 242B.

In one or more embodiments, the other vNVDIMM may be created without replicating (e.g., copying) the first data. For example, vNVDIMM 274B may include memory medium portion 242A, which may store the first data. In one or more embodiments, creating the other vNVDIMM without replicating (e.g., copying) the first data may improve one or more of IHS 110, hypervisor 260, and VM 270, among others. For example, creating the other vNVDIMM without replicating (e.g., copying) the first data may reduce an amount of time to create the other vNVDIMM. For instance, creating the other vNVDIMM without replicating (e.g., copying) the first data may allow and/or permit one or more of IHS 110, hypervisor 260, and VM 270, among others, to process more information within an amount of time.

At 435, information associated with the other vNVDIMM may be provided to the virtual machine. For example, hypervisor 260 may provide information associated with vNVDIMM 274B to VM 270. For instance, hypervisor 260 may provide information associated with vNVDIMM 274B to VM 270 via GPIO 276. In one or more embodiments, information associated with vNVDIMM 274B may include an address and a size. For example, the size may be associated with a size of memory medium portion 242A and a size of memory medium portion 242B. For instance, the size may include a size of memory medium portion 242A added to a size of memory medium portion 242B. At 440, second data associated with the other vNVDIMM may be received from the virtual machine. In one example, hypervisor 260 may receive second data associated with vNVDIMM 274B from VM 270. In another example, IHS 110 may receive second data associated with vNVDIMM 274B from VM 270.

At 445, at least a portion of the second data associated with the other vNVDIMM may be stored via the other portion of storage. For example, at least a portion of the second data associated with vNVDIMM 274B may be stored via medium portion 242B. At 450, a request for data associated with the other vNVDIMM may be receive from the virtual machine. For example, a request for data associated with vNVDIMM 274B may be received from VM 270. At 455, at least a portion of data from the portion of storage may be provided to the virtual machine. For example, at least a portion of data from medium portion 242A may be provided to VM 270. At 460, at least a portion of data from the other portion of storage may be provided to the virtual machine. For example, at least a portion of data from medium portion 242B may be provided to VM 270.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A physical information handling system, comprising:
at least one processor;
a memory medium, coupled to the at least one processor, that stores instructions executable by the at least one processor, which when executed by the at least one processor, cause the physical information handling system to:
store first data associated with a virtual non-volatile dual in-line memory module (vNVDIMM) of a virtual machine via a portion of storage of a first physical memory medium of the physical information handling system;
receive, from the virtual machine, a request for a size increase of the vNVDIMM;
allocate, based at least on the size increase, an other portion of storage from the first physical memory medium or from a second physical memory medium of the physical information handling system;
create a virtual translation table;
create an other vNVDIMM, from the virtual translation table, configured to accommodate the size increase and configured to store data via the portion of storage and the other portion of storage;
provide information associated with the other vNVDIMIM to the virtual machine;
receive, from the virtual machine, second data associated with the other vNVDIMM; and
store at least a portion of the second data associated with the other vNVDIMM via the other portion of storage.

2. The physical information handling system of claim 1, wherein, to provide the information associated with the other vNVDIMM to the virtual machine, the instructions further cause the physical information handling system to provide the information associated with the other vNVDIMM to the virtual machine via general purpose input/output (GPIO) of the virtual machine.

3. The physical information handling system of claim 1, wherein the instructions further cause the physical information handling system to:

receive, from the virtual machine, a request for data associated with the other vNVDIMM;

provide, to the virtual machine, at least a portion of data from the portion of storage; and provide, to the virtual machine, at least a portion of data from the other portion of storage.

4. The physical information handling system of claim 1, wherein, to allocate the other portion of storage from the first physical memory medium or from the second physical memory medium, the instructions further cause the physical information handling system to allocate the other portion of storage from the second physical memory medium; and wherein the first physical memory medium includes a physical non-volatile dual in-line memory module (NVDIMM) and the second physical memory medium includes a second NVDIMM, different from the first NVDIMM.

5. The physical information handling system of claim 1, wherein, to allocate the other portion of storage from the first physical memory medium or from the second physical memory medium, the instructions further cause the physical information handling system to allocate the other portion of storage from the second physical memory medium; and wherein the first physical memory medium includes a physical non-volatile dual in-line memory module (NVDIMM) and the second physical memory medium includes a dual in-line memory module (DIMM) backed by a non-volatile memory medium.

6. The physical information handling system of claim 5, further comprising:

at least one of a hard disk drive and a solid state drive;

wherein the non-volatile memory medium includes the at least one of the hard disk drive and the solid state drive.

7. The physical information handling system of claim 1, wherein, to allocate the other portion of storage from the first physical memory medium or from the second physical memory medium, the instructions further cause the physical information handling system to allocate the other portion of storage from the first physical memory medium; and wherein the first physical memory medium includes a physical non-volatile dual in-line memory module (NVDIMM).

8. A method, comprising:

storing first data associated with a virtual non-volatile dual in-line memory module (vNVDIMM) of a virtual machine via a portion of storage of a first physical memory medium of a physical information handling system;

receiving, from the virtual machine, a request for a size increase of the vNVDIMIM;

allocating, based at least on the size increase, an other portion of storage from the first physical memory medium or from a second physical memory medium of the physical information handling system;

creating a virtual translation table;

creating an other vNVDIMM, from the virtual translation table, configured to accommodate the size increase and configured to store data via the portion of storage and the other portion of storage;

providing information associated with the other vNVDIMM to the virtual machine;

receiving, from the virtual machine, second data associated with the other vNVDIMM; and storing at least a portion of the second data associated with the other vNVDIMM via the other portion of storage.

9. The method of claim 8, wherein the providing the information associated with the other vNVDIMM to the virtual machine includes providing the information associated with the other vNVDIMM to the virtual machine via general purpose input/output (GPIO) of the virtual machine.

10. The method of claim 8, further comprising:

receiving, from the virtual machine, a request for data associated with the other vNVDIMM;

providing, to the virtual machine, at least a portion of data from the portion of storage; and providing, to the virtual machine, at least a portion of data from the other portion of storage.

11. The method of claim 8, wherein the allocating the other portion of storage from the first physical memory medium or from the second physical memory medium includes allocating the other portion of storage from the second physical memory medium; and wherein the first physical memory medium includes a physical non-volatile dual in-line memory module (NVDIMM) and the second physical memory medium includes a second NVDIMM, different from the first NVDIMM.

12. The method of claim 8, wherein the allocating the other portion of storage from the first physical memory medium or from the second physical memory medium includes allocating the other portion of storage from the second physical memory medium; and wherein the first physical memory medium includes a physical non-volatile dual in-line memory module (NVDIMM) and the second physical memory medium includes a dual in-line memory module (DIMM) backed by a non-volatile memory medium.

13. The method of claim 12, wherein the non-volatile memory medium includes at least one of a hard disk drive and a solid state drive.

14. The method of claim 8, wherein the allocating the other portion of storage from the first physical memory medium or from the second physical memory medium includes allocating the other portion of storage from the first physical memory medium; and wherein the first physical memory medium includes a physical non-volatile dual in-line memory module (NVDIMM).

15. A computer-readable non-transitory memory medium that includes instructions that, when executed by at least one processor of a physical information handling system, cause the physical information handling system to:

store first data associated with a virtual non-volatile dual in-line memory module (vNVDIMM) of a virtual machine via a portion of storage of a first physical memory medium of the physical information handling system;

receive, from the virtual machine, a request for a size increase of the vNVDIMM;

allocate, based at least on the size increase, another an other portion of storage from the first physical memory medium or from a second physical memory medium of the physical information handling system;

create a virtual translation table;

create an other vNVDIMM, from the virtual translation table, configured to accommodate the size increase and configured to store data via the portion of storage and the other portion of storage;

provide information associated with the other vNVDIMM to the virtual machine;

receive, from the virtual machine, second data associated with the other vNVDIMM; and store at least a portion of the second data associated with the other vNVDIMM via the other portion of storage.

16. The computer-readable non-transitory memory medium of claim 15, wherein, to provide the information associated with the other vNVDIMM to the virtual machine, the instructions further cause the physical information handling system to provide the information associated with the other vNVDIMM to the virtual machine via general purpose input/output (GPIO) of the virtual machine.

17. The computer-readable non-transitory memory medium of claim 15, wherein the instructions further cause the physical information handling system to:

receive, from the virtual machine, a request for data associated with the other vNVDIMM;

provide, to the virtual machine, at least a portion of data from the portion of storage; and provide, to the virtual machine, at least a portion of data from the other portion of storage.

18. The computer-readable non-transitory memory medium of claim 15, wherein, to allocate the other portion of storage from the first physical memory medium or from the second physical memory medium, the instructions further cause the physical information handling system to allocate the other portion of storage from the second physical memory medium; and wherein the first physical memory medium includes a physical non-volatile dual in-line memory module (NVDIMM) and the second physical memory medium includes a second NVDIMM, different from the first NVDIMM.

19. The computer-readable non-transitory memory medium of claim 15, wherein, to allocate the other portion of storage from the first physical memory medium or from the second physical memory medium, the instructions further cause the physical information handling system to allocate the other portion of storage from the second physical memory medium; and wherein the first physical memory medium includes a physical non-volatile dual in-line memory module (NVDIMM) and the second physical memory medium includes a dual in-line memory module (DIMM) backed by a non-volatile memory medium.

20. The computer-readable non-transitory memory medium of claim 15, wherein, to allocate the other portion of storage from the first physical memory medium or from the second physical memory medium, the instructions further cause the physical information handling system to allocate the other portion of storage from the first physical memory medium; and wherein the first physical memory medium includes a physical non-volatile dual in-line memory module (NVDIMM).

\* \* \* \* \*